United States Patent [19]

Shimizu et al.

[11] 4,321,224

[45] Mar. 23, 1982

[54] METHOD FOR PRODUCTION OF SPHERICAL MOLDED PRODUCT CONTAINING TITANIUM OXIDE

[75] Inventors: Shinkichi Shimizu; Tadao Nishizaki, both of Niihama; Masabumi Tsuda, Takarazuka, all of Japan

[73] Assignee: Sumitomo Chemical Company, Limited, Osaka, Japan

[21] Appl. No.: 108,712

[22] Filed: Dec. 31, 1979

[51] Int. Cl.$^3$ ................................. D04H 3/16
[52] U.S. Cl. .................................. 264/115; 264/117; 264/DIG. 51
[58] Field of Search ............... 264/117, DIG. 51, 115

[56] References Cited

U.S. PATENT DOCUMENTS 2,644,799 7/1953 Robinson ............................. 264/60
2,786,772 3/1957 Stewart et al. ...................... 264/60
3,671,296 6/1962 Funakoshi et al. ................. 427/212

Primary Examiner—James R. Hall
Attorney, Agent, or Firm—Birch, Stewart, Kolasch and Birch

[57] ABSTRACT

A method for the production of a spherical molded product of a titanium oxide composition comprising adding a titanium oxide composition powder and a mist of an aqueous medium to a seed of an inorganic substance, granulating the mixture with a centrifugal fluidizing coating granulator and calcining the resultant spherical product, which is characteristic in that the granulation of the mixture is carried out by adding the titanium oxide composition powder and the aqueous medium in the ratio of addition rate of 1:0.20 to 1:0.35 by weight, whereby there is obtained a spherical molded product having a larger strength with less abrasion. The spherical molded product obtained by the present invention is useful, for instance, as a catalyst carrier or catalyst for the removal of nitrogen oxides from exhaust gases.

12 Claims, No Drawings

METHOD FOR PRODUCTION OF SPHERICAL MOLDED PRODUCT CONTAINING TITANIUM OXIDE

The present invention relates to a method for the production of a spherical molded product containing titanium oxide. More particularly, it relates to a method for the production of a spherical molded product containing titanium oxide which has a large strength with less abrasion which comprises adding a titanium oxide composition powder and a mist of an aqueous medium to a small spherical molded product of a titanium oxide composition and making larger the particle size of the molded product with a centrifugal fluidizing coating granulator.

Catalyst carriers or catalysts are usually used in various forms such as pellet, bar, ring, sphere, honeycomb or other shapes which are packed in a reactor of a fixed bed, moving bed, fluidizing bed, or the like. These catalyst carriers and catalysts should have a large strength in order to use them on a commercial scale, because the products having a large strength can be used without collapse or abrasion during packing or removal from the reactor in the form of pellets, bars, rings, or other shapes.

When the catalyst carriers or catalysts possess a small strength, they readily collapse or become abraded during use, which frequently results in the closing of the reactor or the like. Also, when they are packed in the moving bed or fluidizing bed of a reactor, they cannot be used in the form of pellets, bars, or rings due to the abrasion and hence are usually used in the form of spheres.

It is known that titanium oxide is useful as a catalyst carrier or a catalytic active component, and that a vanadium oxide-titanium oxide composition is useful as a catalyst for the synthesis of phthalic acid, and that a transition metal oxide-titanium oxide composition is useful as a catalyst for the removal of nitrogen oxides. However, these catalyst carriers or catalysts comprising a titanium oxide composition are unfavorably inferior in the mechanical strength, contrary to the conventional molded products of alumina. In order to obtain a spherical molded product of a titanium oxide composition suitable for various utilities, there is usually used a method comprising mixing a fine powder of a titanium oxide composition with an aqueous medium, extruding the mixture with an extruder, and granulating the extruded product into a sphere with a rotary granulator such as a tumbling granulator or a spheronizing comminutor (e.g. Marumerizer) to form a spherical product. However, according to this method, there can not be obtained a product having a large strength.

The present inventors have intensively studied on the method for producing a spherical molded product of a titanium oxide composition having superior mechanical properties. As a result, it has been found that the amount of the aqueous medium used in the granulation of the extruded product into a spherical shape is largely effective on the strength of the product (cf. Japanese patent application No. 92864/1977), and further that when a titanium oxide composition and a mist of an aqueous medium are added to spherical particles molded after extrusion or seed particles having rough surface and then granulating them in order to make the particle size of the product larger, there can be obtained an almost perfectly rounded spherical molded product having an extremely large strength and an excellent abrasive resistance (cf. Japanese patent application Nos. 92865/1977 and 146675/1977).

As a result of further intensive study of the present inventors, it has now been found that a spherical molded product of a titanium oxide composition having a further improved properties can be obtained by adding a titanium oxide composition powder and a mist of an aqueous medium to seeds of an inorganic substance in the ratio of addition rate of the titanium oxide composition powder and the aqueous medium of 1:0.20 to 1:0.35 by weight, followed by forming the mixture into a spherical molded product with a centrifugal fluidizing granulator.

Accordingly, object of the present invention is to provide an improved method for making a spherical molded product of a titanium oxide composition having a large strength with less abrasion.

Another object of the present invention is to provide an improvement in the mechanical strength of a spherical molded product containing titanium oxide.

These objects and advantages of the invention will be apparent to persons skilled in the art by the following description.

The titanium oxide composition may consist essentially of titanium oxide alone or comprise titanium oxide with any other inorganic substances. In any event, the titanium oxide comprises titanium oxide in an amount of not less than about 50% by weight based on the weight of the titanium oxide composition. Other inorganic substances include as a catalytically active substance a complex, salt or oxide of a metal such as vanadium, tungsten, molybdenum, chromium, iron, copper, cerium or tin, and further includes as a catalytically inactive substance alumina, diatomaceous earth, bentonite, etc. Further, the titanium oxide composition may be incorporated with titanic acid, metatitanic acid, etc.

The titanium oxide composition is preferably used in the form of a fine powder prepared by calcining a cake of the composition at a temperature of 300° to 800° C. and pulverizing the resultant with a ball mill or a vibrating ball mill or the like, because it can produce a molded product having a larger mechanical strength.

The molding of the present invention is, for example, carried out as follows.

A clay-like titanium oxide composition is extruded with an extruder to form particles having a bar or bar-like shape, and the extruded particles are granulated into spherical product with a spheronizing comminutor (e.g. Marumerizer) or a tumbling granulator such as dish-shape granulator, by which a seed is obtained. There may also be used seeds of alumina, silica, zirconia, silicon carbide, mullite, cordierite, or the like. The dry or slightly wet seeds are charged into a centrifugal fluidizing coating granulator and thereto are added the titanium oxide composition powder and an aqueous medium in the form of mist in the ratio of addition rate of 1:0.20 to 1:0.35 by weight, and the resulting mixture is granulated in the centrifugal fluidizing coating granulator to form a larger size of spherical granules. The resulting granules are dried and further are calcined to give the desired spherical molded product having a large strength.

The centrifugal fluidizing coating granulator (cf. U.S. Pat. No. 3,671,296) used in the present invention includes a conventional rotary granulator consisting of a vertical cylinder and a rotary bottom plate, wherein the bottom plate rotates at a high speed and whereby the particles introduced therein are coated with powder and are abraded and densified at both faces of the bottom plate and the cylindrical side walls, to give spherical granules. A spheronizing comminutor having the same mechanical principle (e.g. a Marumerizer) can also be employed.

The aqueous medium which is used as the spraying medium of the present invention includes water, an aqueous solution of mineral acids (e.g. hydrochloric acid, sulfuric acid, nitric acid), organic acids (e.g. formic acid, acetic acid, propionic acid, oxalic acid, butyric acid, maleic acid, chloroacetic acid), bases (e.g. ammonia, methylamine, ethylamine), various metal salts (e.g. vanadyl oxalate), and alcohols, (e.g. methyl alcohol, ethyl alcohol). The aqueous medium is used for the purpose of improving the mechanical properties or activities of the molded product or as a carrier of catalytic active components.

The ratio of addition rate of the titanium oxide composition and the aqueous medium are effective on the molding performance and the mechanical strength and abrasion resistance of the molded product, and hence, it should be controlled. The ratio of addition rate of the titanium oxide composition powder and the sprayed aqueous medium is in the range of 1:0.20 to 1:0.35 by weight.

When the ratio of addition rate of the aqueous medium is larger than 0.35 per 1 of that of the titanium oxide composition powder, amount of water oozes out from the surface of the particles, and hence, the resulting spherical molded product has a rough surface. Also, the particles have an increased tackiness and hence aggregate each other to give a mass product. Moreover, the molded product has a low packing density and a small mechanical strength, and furthermore occasional voids within the particles, which results in an extremely low mechanical strength.

On the other hand, when the ratio of addition rate of the aqueous medium is smaller than 0.20 per 1 of that of the titanium oxide composition powder, it tends to produce a confetti-like molded product having uneven surface.

In one embodiment of the present invention, the titanium oxide composition powder may be slightly wetted by initially adding thereto an aqueous medium in an amount of less than about 10% by weight based on the weight of the titanium oxide composition powder which does not produce an undesirable effect on the fluidity and granulating properties of the titanium oxide composition powder, and by which dust can be prevented. In this case, the spraying amount of the aqueous medium is reduced so that the total amount of the aqueous medium is in the range of the ratio of 1:0.20 to 1:0.35 by weight as mentioned hereinbefore. And also when wet seeds are employed, the spraying amount of the aqueous medium is similarly controlled.

The most suitable addition rate of the titanium oxide composition and the aqueous medium may be determined in accordance with the scale of the centrifugal fluidizing coating granulator, the amount of particles in the cylinder, and the particle diameter, but it is usually preferable that at a small particle size, the rate of increasing the particle size (diameter of particle/time) is smaller, and at a larger particle size, the rate of increasing the particle size is increased. In an embodiment, when the particle size is 2-3 mm, the rate of increasing the particle size is preferably about 0.02 mm/minute, and when the particle size is 3-5 mm, the rate of increasing the particle size is preferably about 0.13 mm/minute. From this viewpoint, the granulating step is preferably divided step-wise and the granulating is carried out by multiple steps, because the manner is suitable for producing the desired product in a commercial scale and also the addition rate of the titanium oxide composition powder and the aqueous medium is easily controlled.

When the particle size is increased from too high a rate in the granulation step, particularly at the stage of the small particle size, the particles tends to aggregate to form a dumpling product, and hence, there can hardly be obtained the desired molded products having uniform particle size and perfectly round shape. On the other hand, when the granulating rate is decreased, the productivity is decreased, while the products have a beautiful shape and a glazed surface.

The calcination of the granules thus obtained is carried out at a suitable temperature which may vary depending upon the components of the titanium oxide composition and the desired utility of the final product, but it is usually done at a temperature of not higher than 1,000° C., preferably 300° to 800° C. For instance, when a vanadium oxide-titanium oxide catalyst useful for the removal of a nitrogen oxides is prepared, the calcination is preferably carried out at a temperature of 300° to 650° C. When the molded product consisting of titanium oxide is calcined at a temperature of 650° to 900° C., (while the temperature may somewhat vary depending upon the kind and amount of other additives), a transition from the anatase form to the rutile form occurs together with sintering, and the resulting product becomes dense and has a small surface, while the mechanical strength of the product is largely increased. Such a product having a small surface is not suitable for a catalyst or catalyst carrier because of less catalytic activity. However, when the product is used for the selective oxidation of hydrocarbons or other organic compounds, the product in the rutile form may occasionally be preferable. The calcination period of time affects the properties and strength of the final product and is usually in the range of 1 to 10 hours.

The molded product obtained by the present invention has a sufficient strength and can be used in a commercial scale, and further has sufficient physical properties such as surface area and pore volume which are necessary for the use thereof as a catalyst carrier or catalyst. Particularly, the molded product has favorably an excellent abrasion resistance, less pressure loss and ease in handling.

Moreover, the method of the present invention has various advantages in that it is not required to add a binder which causes a lowering of the activity of the product (even if necessary, it is sufficient in only a slight amount), and in that it is not required to calcine at a high temperature (e.g. higher than 650° to 800° C.) which causes a lowering of the activity of the product. Accordingly, the catalyst carrier or catalyst produced by the method of the present invention has high activity, and further is not cracked or pulverized even if it is used for a long period of time. Besides, the product of the present invention can be used as a catalyst for a moving bed in the treatment of exhaust gases containing a large amount of dusts, without cracking or abrasion.

The present invention will be illustrated by the following Examples but it is not intended to limit the invention thereto. In Examples, "part" and "%" are shown by weight and by volume, respectively, unless specified otherwise.

EXAMPLE 1

Vanadium oxide/titanium oxide (V/Ti=1/12 by atomic ratio, 100 parts) was finely pulverized with a vibrating ball mill and thereto was added water (as an aqueous medium, 40 parts) and the mixture was well kneaded with agitation with a kneader to give a clay-like titanium oxide composition. The composition thus obtained was formed into bar shape having a diameter of 2 mm with an extruder. The bar-shaped product (1 kg) was charged into a spheronizing comminutor (a Marumerizer Q-230, made by Fuji Powdal Co., diameter of the cylinder: 230 mm), and the bottom plate was rotated at 820 rpm, by which the bar-shaped product was cut and formed into spherical seeds having a diameter of 1.7–2.8 mm.

The seeds were thus obtained (100 ml) and charged into a cylinder of a Marumerizer (pitch of the bottom plate: 2 mm×2 mm), and the bottom plate was rotated at 355 rpm, during which the titanium oxide composition powder obtained above was supplied at a rate of 10 g/minute and water was simultaneously sprayed at a rate of 2.9 g/minute for 45 minutes, and thereby the size of the granules was increased until they attained a diameter of about 3 mm. The product yield was 500 ml.

The product having a diameter of 3 mm thus obtained (200 ml) was charged into the same Marumerizer as used above and the bottom plate was rotated under the same condition, during which the titanium oxide composition powder was supplied at a rate of 40 g/minute and water was simultaneously sprayed at a rate of 11.75 g/minute for 15 minutes, and thereby the size of the granules was increased until they attained a diameter of about 5 mm (in average, 5.1 mm). The yield of the product was 865 ml.

During the first granulation of from the seed to the granules having a diameter of about 3 mm and the second granulation of from the product having a diameter of about 3 mm to the product having a diameter of 5 mm, the ratio of addition rate of the titanium oxide composition powder and the aqueous medium was 1:0.29 by weight.

The spherical molded product thus obtained was air-dried for 2 days, and thereafter, the product was charged into an electrical furnace, and the furnace was heated to 400° C. during 2 hours, and kept at the temperature for 5 hours, and thereafter cooled. After the calcination, the product was taken out from the furnace. The product thus obtained had a packed density of 1.15 g/cm$^3$, a crush strength of 8.7 kg (measured by a Kiya type hardness meter) and a wear rate of less than 0.01% (measured by the method described in JIS K-1464).

The product obtained above was tested on the activity as a catalyst for the removal of nitrogen oxides by treating an exhaust gas containing O$_2$ of 2.8%, H$_2$O of 12.0%, NO of 130 ppm, NH$_3$ of 130 ppm and N$_2$ of balance at a space velocity of 20,000 hr$^{-1}$ and at a temperature of 350° C. As a result, 85% of NO contained in the exhaust gas was removed. Besides, when the exhaust gas was treated at a space velocity of 10,000 hr$^{-1}$ and at a temperature of 350° C., 97% of NO was removed.

EXAMPLE 2

In the same manner as described in Example 1 except that a 1 N nitric acid aqueous solution was used as the aqueous medium, the titanium oxide composition was molded and calcined to give a spherical molded product having an average particle size of 5.0 mm, a packed density of 1.18 g/cm$^3$ and a crush strength of 9.2 kg.

EXAMPLE 3

In the same manner as described in Example 1, there was prepared a seed by using a titanium oxide composition of V/W/Ti=8/4/120 by atomic ratio.

The seeds were thus obtained (100 ml) and charged into a mortar of a Marumerizer (pitch of the bottom plate: 2 mm×2 mm) and the mortar was rotated at 355 rpm, during which the titanium oxide composition powder having the same components as in the composition used above for preparing a seed was supplied at a rate of 10 g/minute and water was simultaneously sprayed at a rate of 3.1 g/minute for 45 minutes, and thereby the size of the granules was increased until they attained a diameter of about 3 mm. The yield of the product was about 500 ml.

The product having a diameter of 3 mm thus obtained (200 ml) was charged into the same Marumerizer as used above and the mill was rotated likewise, during which the titanium oxide composition powder was supplied at a rate of 40 g/minute and water was simultaneously sprayed at a rate of 12.4 g/minute for 15 minutes, and thereby the size of the granules was increased until they became to have a diameter of 5 mm (in average, 5.1 mm). The yield of the product was 850 ml.

During the first granulation and the second granulation, the addition rate of the titanium oxide composition powder and water was in the ratio of 1:0.31.

By calcining the product in the same manner as described in Example 1, there was obtained a spherical molded product having a packed density of 1.23 g/cm$^3$ and a crush strength of 9.6 kg.

The product thus obtained was tested on the activity as a catalyst for the removal of nitrogen oxides by treating an exhaust gas containing O$_2$ of 2.8%, H$_2$O of 12.0%, NO of 130 ppm, NH$_3$ of 130 ppm and N$_2$ of balance at a space velocity of 20,000 hr$^{-1}$ and at a temperature of 350° C. As a result, 87% of NO contained in the exhaust gas was removed. Besides, when the exhaust gas was treated at a space velocity of 10,000 hr$^{-1}$ and at a temperature of 350° C, 97% of NO contained in the gas was removed.

EXAMPLE 4

A mixture of the same vanadium oxide/titanium oxide composition as used in Example 1 (100 parts) and crystalline cellulose powder (Abicel, a tradename of Asahi Chemical Co., 5 parts) was finely pulverized with a vibration ball mill. The resulting mixture was treated in the same manner as described in Example 1 to give a seed having a diameter of 2–3 mm.

In the same manner as described in Example 1 except that the spraying rate of water was slightly increased so that the addition rate of the titanium oxide composition powder and water in the first granulation and the second granulation was in the ratio of 1:0.32 by weight, there was produced a spherical molded product having an average diameter of 5.0 mm, a packed density of 1.05 g/cm$^3$ and a crush strength of 8.3 kg.

REFERENCE EXAMPLE 1

Example 1 was repeated except that the spraying rate of water was changed so that the addition rate of the titanium oxide composition powder and water was in the ratio of 1:0.17. As a result, there was obtained a confetti-like molded product, and there could not be obtained a perfectly round spherical molded product.

REFERENCE EXAMPLE 2

Example 1 was repeated except that the spraying rate of water was changed so that the addition rate of the titanium oxide composition powder and water was in the ratio of 1:0.37. As a result, it was observed that moisture oozed out from the surface of the particles and the product had rough surface. Besides, because of the tackiness of the particles, about 5 to about 20 particles aggregated to give a mass of particles. When the granulated product was calcined at 400° C., the product partially cracked and had a crush strength of 2.4 kg.G.

What is claimed is:

1. A method for the production of a spherically molded product of a titanium oxide composition comprising:
   (A) charging a rotatable centrifugal fluidizing coating granulator with seeds of an inorganic substance,
   (B) during rotation of said granulator, introducing into said granulator a first stream comprising a titanium oxide composition powder and simultaneously introducing into said granulator a second stream comprising a mist of an aqueous medium of finely divided aqueous droplets, wherein the weight ratio of said powder to said aqueous medium introduced into said granulator is from 1:0.20 to 1:0.35 and whereby said seeds are coated and enlarged in size to form a spherical product, and
   (C) calcining said spherical product at a temperature of from about 300° to about 800° Centigrade for a period of from 1 to 10 hours.

2. The method of claim 1, wherein said titanium oxide composition powder introduced at step B comprises a member selected from the group consisting of titanium oxide and a mixture thereof with a compound of a metal selected from the group consisting of vanadium, molybdenum, chromium, iron, copper, cerium and tin.

3. The method of claim 1, wherein said titanium oxide composition powder is prepared prior to step B by:
   (A) calcining the composition at a temperature of from 300° to 800° Centigrade to form a cake of the titanium oxide composition, and
   (B) pulverizing said cake.

4. The method of claim 1, wherein the seeds of an inorganic substance used in step A are seeds obtained from the same titanium oxide composition used in step B.

5. The method of claim 1, wherein the seeds of an inorganic substance used in step A are seeds of a member selected from the group consisting of alumina, silica, zirconia, silicon carbide, mullite and cordierite.

6. The method of claim 1 wherein, prior to step B, the titanium oxide composition is initially admixed with an aqueous medium to form a wet powder and wherein the total amount of aqueous medium and titanium oxide composition added during step B is maintained at a weight ratio of said powder to said aqueous medium of from 1:0.20 to 1:0.35.

7. The method of claim 4, wherein prior to step A of claim 1, said seeds are initially admixed with an aqueous medium and wherein the amount of aqueous medium mist added in step B is correspondingly reduced so that the total amount of titanium oxide composition powder and aqueous medium added to said seeds is maintained at a weight ratio from 1:0.20 to 1:0.35.

8. The method of claim 6, wherein the titanium oxide composition is initially admixed with an aqueous medium in an amount of less than about 10% by weight based on the weight of the titanium oxide composition.

9. The method of claim 2, wherein the titanium oxide composition contains at least 50% by weight of titanium oxide.

10. The method of claim 8, wherein the titanium oxide composition further includes a catalytically inactive substance selected from the group consisting of alumina, diatomaceous earth, and bentonite.

11. The method of claim 1, wherein the aqueous medium is selected from the group consisting of water, mineral acids, organic acids, bases, metal salts and alcohols.

12. The method of claim 1, wherein the calcination of step C is conducted at a temperature of from 300° to 650° Centigrade for a period of from 1 to 10 hours.

* * * * *